Dec. 15, 1959 LI-YEN CHEN 2,917,580

CARRIER TELEPHONE SYSTEM

Filed April 29, 1955 2 Sheets-Sheet 1

INVENTOR.
LI-YEN CHEN
BY
Chandlee Pidgeon
AGENT.

INVENTOR.
LI-YEN CHEN
BY
C. Chandler Pidgeon
AGENT.

United States Patent Office 2,917,580

Patented Dec. 15, 1959

2,917,580

CARRIER TELEPHONE SYSTEM

Li-Yen Chen, Canton, Kwangtung, China

Application April 29, 1955, Serial No. 504,998

4 Claims. (Cl. 179—1)

This invention relates to a carrier telephone system and particularly to a carrier telephone system for short-haul circuits with one-way or two-way signalling or toll dialing. When more than one channel of speech is transmitted over one pair of wires, different frequencies are needed for different channels. Filters are necessary at the receiver to separate the channels from one another. The construction of filters is critical and expensive and renders such systems uneconomical for such short-haul circuits. Also synchronizing and other complexities in those carrier terminals makes it impossible to run them unattended.

My invention departs from the prior art by using both side bands for two-way transmission. Also, a single oscillator is used to supply a carrier for both terminals. Thus no filter is needed and no synchronization is required. I have developed a vacuum tube hybrid that can distinguish the incoming signal from the outgoing signal. This hybrid combined with other novel circuits makes up a complete carrier telephone system. The complete system includes one master terminal and one slave terminal.

By the use of my invention I am enabled to use two or more telephone circuits on one pair of conductors over short distances at a cost much less than with other systems. Furthermore, it is possible to operate this system with one terminal at a remote location without power supply. The system is self contained with signalling devices including dialing for automatic telephones.

An object of this invention is to provide two or more telephone circuits over one pair of open-wire lines or cable.

It is another object of this invention to employ both the upper and lower side bands for two-way transmission to simplify the construction of the terminals.

It is still another object of this invention to supply desired frequencies to the terminals by means of a single oscillator, and thus eliminate necessity for synchronization.

Another object of this invention is the provision of means to modulate the oscillator directly to obtain the carrier as well as two side bands, to simplify the construction of the terminals.

It is a further object of this invention to control the oscillation of the master terminal directly for signalling purposes.

It is a further object of this invention to employ a novel vacuum tube hybrid circuit in order to avoid the necessity for band pass filters.

Another object of this invention is the employment of carrier frequency separation greater than 20 kilocycles, so that low pass filters are not required at any terminal.

The above and other objects will appear from a consideration of the following detailed specification taken with the accompanying drawings forming a part thereof:

Figure 1:
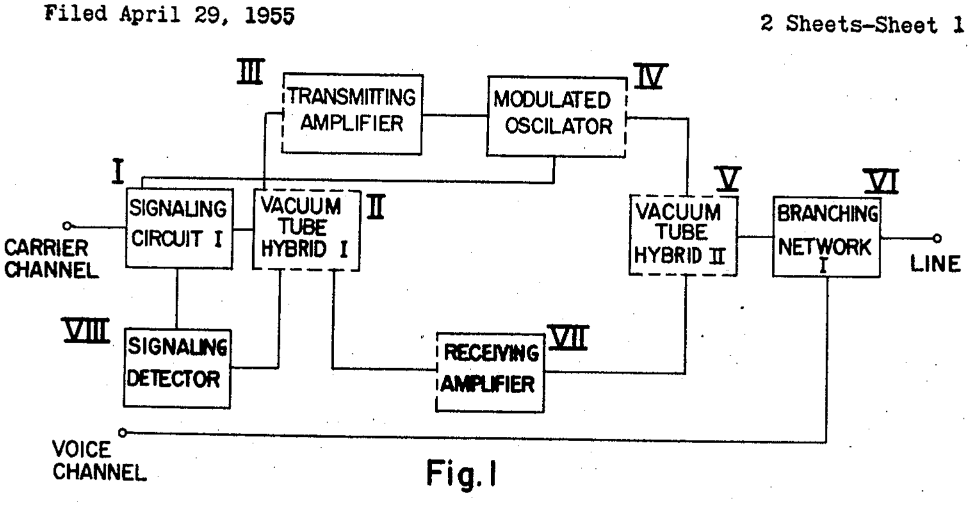
Fig. 1 is a block diagram showing the operation of the device according to this invention.

Referring now to Fig. 1, I show a block diagram of a master terminal for two-way ringing signalling. The several blocks I to VIII inclusive include elements of this system as indicated by the legends on the blocks and lines. Hereinafter, the blocks will be referred to by the numerals used.

It is to be noted that carrier telephone systems now in use are equivalent to four-wire circuits in the frequency scale because one part of the frequency spectrum is assigned to transmit speech in one direction while another part of the frequency spectrum is used to transmit speech in the reverse direction. The reason for this is that there must be some gain in both the transmitting and receiving branches. If the same frequency be used in both branches, a local closed loop is formed which causes singing in the terminal. To avoid formation of a local closed loop, the branches are designed to work on different frequencies and band pass filters are employed which thus make the carrier channels equivalent to a four-wire circuit.

It has been found to be possible to use the same frequency spectrum for two-way transmission or with carrier circuits in a two-wire equivalent if there be a suitable means to keep signals in the transmitting branch from getting into the receiving branch. For such purposes, a hybrid coil is used. However, due to construction difficulties it is difficult to make hybrid coils work at carrier frequencies. Furthermore, hybrid coils are sensitive to variation in line condition, and the balance is upset by line changes due to weather variations, especially at carrier frequencies.

A vacuum tube hybrid, as devised by me and used for many months without readjustment, is disclosed in my co-pending application, Serial No. 504,997, filed April 29, 1955. The balance of such a circuit is not so critical as that of a hybrid coil. This circuit renders it possible to operate carrier circuits in a two-wire equivalent. By using this circuit combined with suitable band pass filters, half the frequency spectrum is saved, or the number of channels used can be doubled using the same frequency spectrum. In this system the vacuum tube is employed not merely to save the frequency spectrum, but to simplify the construction of terminals. This results in using one vacuum tube hybrid to perform many functions of the carrier terminals.

Figure 2:
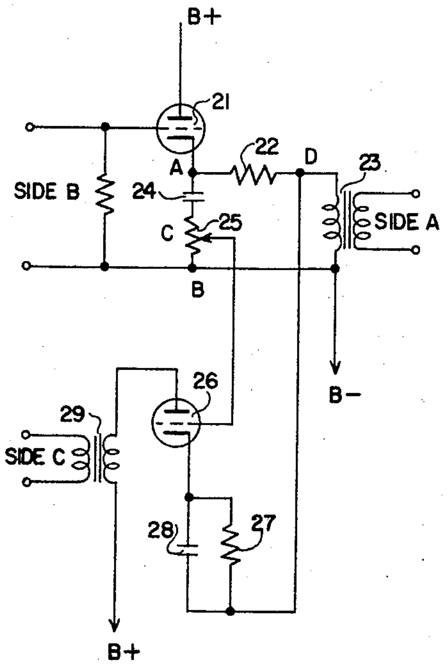
Fig. 2 is a circuit diagram of a vacuum tube hybrid used in this invention.

Referring to Fig. 2, I show the circuit of the vacuum tube hybrid detailed in my copending application above referred to, and which couples a four-wire circuit to or from a two-wire circuit. In this diagram the side B is the receiving branch of the four-wire circuit, side C is the transmitting branch of the four-wire circuit, and side A is the two-wire circuit. All incoming signals from side B will be transmitted to side A by means of the cathode coupled amplifier tube 21. Part of the amplified signal is dissipated by the resistor 22. However, the amplifier tube 21 has an overall gain greater than the loss in the resistor 22, so that side A receives more power than if connected directly to side B. This is an improvement over a hybrid coil since there is a gain in the signal passing through this circuit, rather than a loss as with a hybrid coil. The condenser 24 is a blocking condenser to prevent D.C. voltage in the cathode circuit of tube 21 reaching the tube 26, and has no effect on the signal frequency.

Condenser 27 and resistor 28 provides the necessary

C-bias for tube 26. They also have no effect on the frequency response. The load coil or transformer 23 can be omitted in some cases and the load may be directly connected to the cathode circuit.

Figure 3:
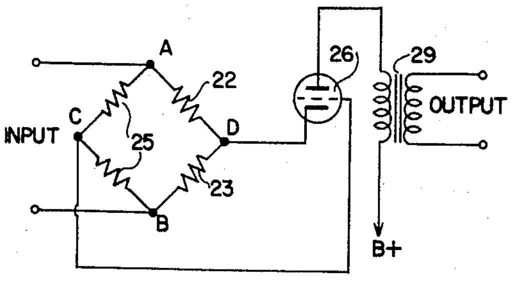
Fig. 3 is a bridge diagram of the circuit of Fig. 2 for receiving.

A bridge connection is formed by this circuit as shown in Fig. 3, where the same numerals are used as in Fig. 2 to represent the same elements or their equivalent resistances. The letters A, B, C and D as used on the corners of the bridge are also used in Fig. 2. The amplified signal in the amplifier tube 21 is connected to points A and B, while the grid and cathode of the amplifier tube 26 are connected respectively to points C and D. It is to be noted that the upper and lower arms of the potentiometer form the arms A—C and C—B of the bridge. This potentiometer is adjusted to balance the bridge.

Figure 4:
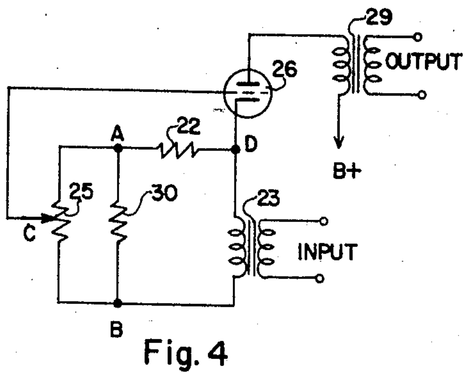
Fig. 4 is a simplified representation of the circuit in Fig. 2, for transmitting.

In Fig. 4, the circuit is rearranged for transmitting from side A to side C. The same symbols and letters are used here as in Figs. 2 and 3. The output impedence of the tube 21 is represented by the resistance 30. As is well known, the output impedence of a cathode coupled amplifier is very low, and it may be assumed that points A and B are virtually shorted. All signals from side A, will appear across points D and B which are in a circuit including the secondary of the transformer 23. As these points A and B are at nearly the same potential and close to ground, the amplifier 26 operates in the manner of a grounded grid amplifier, and a signal impressed on the cathode will be amplified in the plate circuit. Due to the low output impedence of the amplifier tube 21, and the thus formed imperfect short of points A and B, some signal voltage reaches the grid of the amplifier 26. This portion of the signal voltage is in phase with that at point D, so that the only result is a slight reduction in gain in the amplifier 26. As the resistance 30 is very low, such loss is small. The net result of a signal transfer from side A to side C is a gain.

Figure 5:
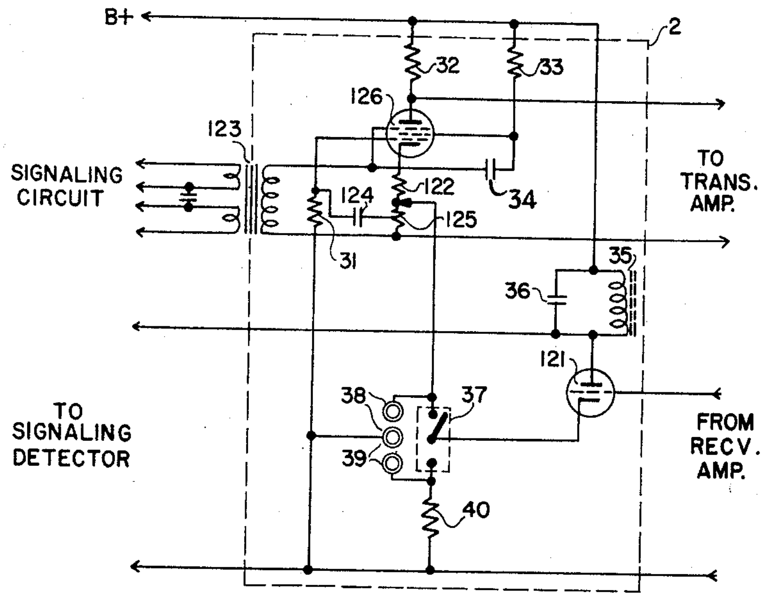
Fig. 5 is an additional vacuum tube hybrid circuit.

In Figure 5, I show another form of vacuum tube hybrid, for a carrier system. It is identified as block II in Fig. 1. The signal from the receiving amplifier, block VII, is fed to the grid of the cathode follower tube 121. The output of tube 121 after passing through the switch 37 is fed to the transformer 123 through a resistor 122. Potentiometer 125 is adjusted to balance out any incoming signal which may appear on the cathode of transmitting amplifier 126, block III of Fig. 1. Thus no signal from the receiving amplifier, block VII of Fig. 1, will appear in the plate circuit of the amplifier 126. The switch 37 and jacks 38, 39 are provided to facilitate adjustment of the carrier terminal. When the switch 37 is in the lower position, the transmitting branch is isolated from the receiving branch to avoid closed-loop singing. Resistor 40 is the cathode resistor of the amplifier tube 121 when the switch arm is in the lower position. The output of the receiving branch is fed to jack pair 39 for indicating the balanced condition of vacuum tube hybrids I and II, blocks II and V of Fig. 1. For balancing vacuum hybrid I, a tone signal being impressed on jack pair 38 to simulate a received signal, and a level indicator is used at jack pair 39. Potentiometer 125 is adjusted to balance out the tone from the plate circuit of the transmitting amplifier 126.

The tank circuit including coil 35 and condenser 36 in the plate circuit of the tube 121 is used to abstract the ringing signal from the receiving branch, and has little effect on the received signal because the cathode follower is not sensitive to a small reduction in plate supply voltage. When a ringing signal of 2300 c.p.s. appears in the received signal the amplifier tube 121 and its associated circuitry operates as a Class A amplifier and a considerable signal is available across the tank circuit. The outgoing signal from a local subscriber is passed by transformer 123 to the cathode of amplifier 126, and due to the low output impedance of the amplifier 121 tube the potentiometer 125 is, in effect grounded, and the amplifier 126 operates substantially as a grounded grid amplifier. The outgoing signal is amplified and appears across the plate resistor 32. Resistor 33 supplies the screen grid potential for the pentode amplifier 126, and the condenser 34 is the screen by-pass.

The vacuum tube hybrid of Fig. 5, in addition to performing the function of a hybrid coil, also acts as a transmitting amplifier, matching the high output impedence of the receiving amplifier to a low impedence line and a power amplifier for signalling current.

Figure 6:
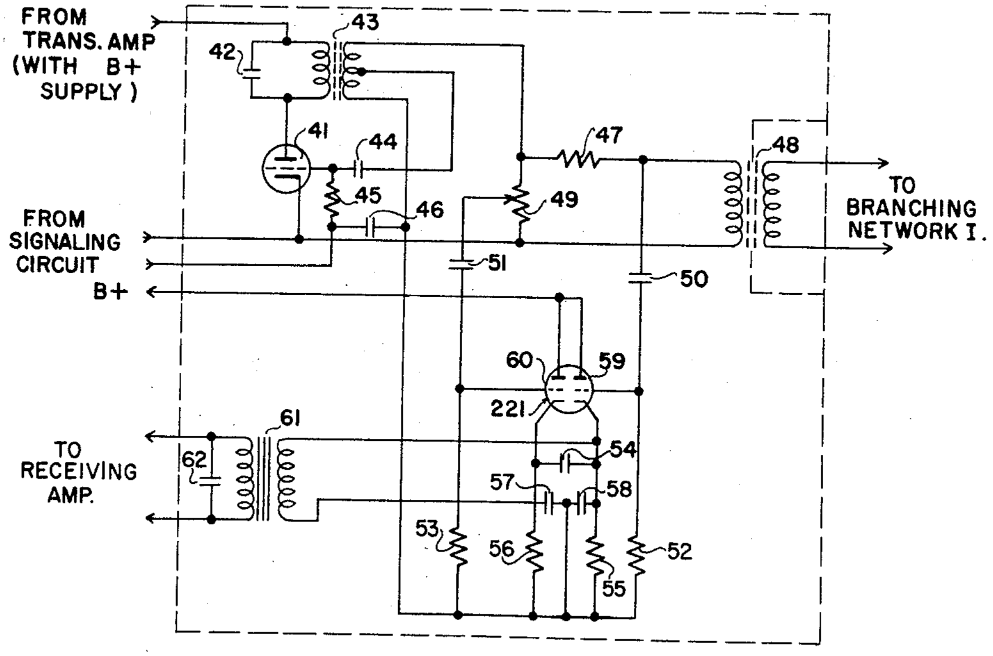
Fig. 6 is still another vacuum tube hybrid circuit.

Fig. 6 shows a further modification of the vacuum tube hybrid for this carrier system. It is identified as block V in Fig. 1. The outgoing signal is fed to the plate circuit of the vacuum tube 41. The tank circuit comprises the condenser 42 and the transformer 43 in this plate circuit, and by suitable design of this transformer, it performs the frequency determining function. A portion of the output of the transformer is fed to the grid of the tube 41 through the condenser 44. A resistor 45 is connected through the signalling circuit and is normally grounded. Vacuum tube amplifier operates as a plate modulated oscillator to produce the carrier and side bands for the carrier terminal. The carrier and both side bands are fed through the resistor 47, the transformer 48 and the branching network I to the line. A twin triode 221 is used as two cathode follower detectors 59, 60. The cathodes of the triode 221 are connected to the primary of the output transformer 61. The function of detection is due to the combination of the resistors 55, 56 and the condensers 57, 58, and the cathodes follow the envelope of the carrier rather than the peak values. Resistors 52 and 53 are grid leak resistors and condensers 50, 51 are blocking condensers. Detector 59 is fed at the junction between resistor 47 and the secondary of transformer 48, while the detector 60 is fed by a suitable point on the potentiometer 49.

Adjustment of the carrier line balance is made by impressing a tone on the carrier channel and with switch 37 in the lower position and a level indicator in jack pair 39. A balance will be indicated by a minimum reading on the indicator when the potentiometer 49 has been adjusted to the proper position.

A signal from the carrier line appears at the junction of resistor 47 and transformer 48 and thus on the grid of the detector 59. Due to the low impedance of the transformer 43, the potentiometer 49 is practically short circuited, and no output potential is present in the cathode circuit of the amplifier 60. The detected output in the cathode circuit of the amplifier 59 will go to the transformer 61 and be transferred to the receiving amplifier. Condensers 54 and 62 are bypass condensers to reduce carrier leak from the detectors to the receiving amplifier.

It is to be understood that other modifications may be made within the skill of the art and the scope of the appended claims.

What is claimed is:

1. In a terminal for a carrier telephone system, a signalling circuit, a transmitting amplifier, a receiving amplifier and a branching network, a first vacuum tube hybrid having its input coupled to the signalling circuit the receiving amplifier and the transmitting amplifier, a modulated oscillator having its output coupled to the signalling circuit and to the transmitting amplifier, a second vacuum tube hybrid having its input coupled to the modulated oscillator the receiving amplifier and the branching network.

2. The terminal of claim 1 wherein the first tube hybrid comprises a cathode follower detector, having its input fed from the output of the receiving amplifier, and an amplifier which has a grid, a cathode and a plate, and circuits therefor, the grid circuit being connected to the cathode of the cathode follower amplifier, the plate being connected to the transmitting amplifier and the cathode circuit being connected through the signalling circuit to a two wire circuit.

3. The terminal of claim 1 wherein the second vacuum tube hybrid comprises a detector cathode follower having two grids and two cathodes, one grid being connected to the branching network, the other grid being connected to the output of the modulated oscillator, the cathodes being connected across the receiving amplifier; the electron tube oscillator having grid, plate and cathode circuits, a tank circuit in the plate circuit supplied with energy from the transmitting amplifier, means transferring a portion of the energy of said tank circuit to the grid of the electron tube oscillator, means coupling the output of said oscillator to the branching network and means connecting the grid and cathode of said oscillator to the signalling circuit.

4. Means for separating frequencies in a carrier system including a transmitting amplifier, a receiving amplifier, a signalling circuit, a signalling detector, a modulating oscillator and a branching network; the improvement comprising a vacuum tube hybrid comprising an electron tube amplifier and a cathode follower amplifier each having a grid, a plate and a cathode, the signalling circuit being connected to the input of the electron tube amplifier, and the output of said electron tube amplifier being connected to the input of the transmitting amplifier, the cathode follower amplifier having its grid and cathode coupled to the input of the receiving amplifier and its plate and cathode coupled to the input of the signalling detector, a second vacuum tube hybrid comprising a second cathode follower detector having its output coupled to the branching network and to the receiving amplifier, means balancing the input to the first cathode follower amplifier to prevent mixing of the receiving and transmitting currents.

References Cited in the file of this patent

UNITED STATES PATENTS

| | | |
|---|---|---|
| 1,990,414 | Newby et al. | Feb. 5, 1935 |
| 2,407,238 | Abraham | Sept. 10, 1946 |
| 2,535,446 | Mitchell | Dec. 26, 1950 |
| 2,692,024 | Edwards | Feb. 17, 1953 |